DISCHARGE DEVICE CONTROLLED BY ON CIRCUIT AND OFF CIRCUIT
WITH EXCESSIVE CURRENT-LIMITING MEANS IN OFF CIRCUIT
Filed Aug. 18, 1966

Alexander A. Gorski
Chris Pappas,
INVENTORS.
BY Harry M. Saragovitz
Edward J. Kelly
Herbert Berl
Alfred E. Smith

United States Patent Office 3,414,825

Patented Dec. 3, 1968

3,414,825

DISCHARGE DEVICE CONTROLLED BY ON CIRCUIT AND OFF CIRCUIT WITH EXCESSIVE CURRENT-LIMITING MEANS IN OFF CIRCUIT

Alexander A. Gorski, Cinnaminson, N.J., and Chris Pappas, Lansdowne, Pa., assignors, by mesne assignments, to the United States of America as represented by the Secretary of the Army Filed Aug. 18, 1966, Ser. No. 573,765
4 Claims. (Cl. 328—232)

ABSTRACT OF THE DISCLOSURE

A protection circuit for an electrical circuit for component equipment protection against excessive current damage. The protection circuit will activate when necessary and will automatically reset when danger is past. The circuit includes a thyratron in parallel with a klystron and a vacuum tube switch, and a time delay circuit for monitoring the current level and activating the thyratron when the current level becomes excessive. Activating the thyratron shorts the current to a common return before a circuit damaging current level is reached.

This invention relates to a protection circuit and more particularly to an electronic circuit for protecting circuit components from catastrophic failure.

The primary method of operation of protection circuits is one of controlling current flow or voltage. Overcurrent devices protect against transients and spurious signals, and in most applications, these devices are associated with the input and output stages of equipment power supplies. There is a need for equipment protection within a circuit when the current drain exceeds the current rating of the circuit components involved, that is, protection circuits which will activate when necessary and which will automatically reset when the danger to circuit components has been removed.

An object of this invention is to provide a simple protection circuit for electronic circuit components.

Another object of this invention is to provide a protection circuit for limiting the time period of high peak currents.

A further object of this invention is to limit undesired arcing currents to a predetermined time period and thereby protect the circuit components from catastrophic failure.

Other objects and advantages of this invention will be better understood from the following detailed description and from the accompanying drawings illustrating an example of the invention and wherein.

Figure 1:
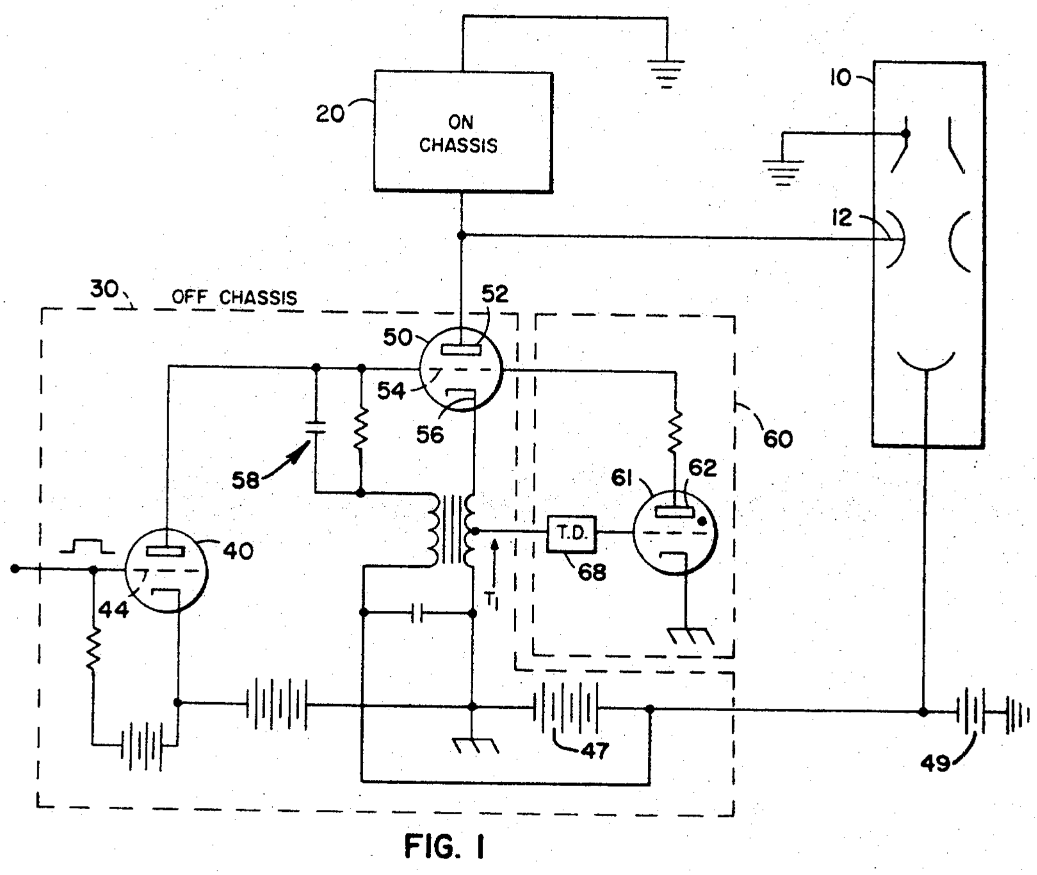
FIGURE 1 is a circuit diagram of an embodiment made in accordance with the principle of this invention.

Referring now to the drawing, FIGURE 1 discloses a schematic representing one embodiment of the invention including a klystron 10, an ON chassis 20 for turning klystron 10 on by switching klystron modulating anode 12 to ground from the previous cathode plus bias potential of the klystron, an OFF chassis 30 including vacuum tubes 40 and 50 and transformer TI for returning modulating anode 12 to cathode potential plus bias, and a protection circuit 60 including a thyratron 61 and time delay network 68 which prevents high discharge currents from damaging the OFF chassis.

The klystron modulating anode 12 is connected to ON chassis 20 and to OFF chassis 30, being connected through OFF chassis 30 to cathode plus bias potential. Modulating anode 12 is connected to a plate 52 of vacuum tube 50. A cathode 56 of tube 50 is connected through a tapped side of transformer TI to a circuit common return and power source. A control grid 54 of tube 50 is connected to a plate 62 of thyratron 61, to a plate of vacuum tube 40, and through a resistance-capacitance network 58 to another side of transformer TI. The tap on transformer TI is connected through a time delay network 68 to the grid of thyratron 61. The cathode of thyratron 61 is connected back to transformer TI through the common return. A positive voltage is permanently supplied to the plates of tubes 40 and 61 and to the grid of tube 50 through transformer TI and resistance-capacitance network 58. When tube 40 is active or conducting however, this voltage is effectively removed from the other tubes.

During normal operating conditions, klystron 10 is pulsed at regular intervals of time from an OFF condition to an ON condition. During the ON condition, OFF chassis 30 is turned off by biasing vacuum tube 50 off. This is accomplished by applying a positive pulse to grid 44 of vacuum tube 40, causing vacuum tube 40 to conduct and maintain a negative voltage at grid 54 of vacuum tube 50. This negative voltage will also be present on plate 62 of thyratron 61 to stop conduction of the thyratron during the ON condition.

Figure 2:
FIGURE 2 is a sketch of the load current waveform pulse under normal operating conditions.

During the inter-pulse period, the positive signal is removed from grid 44 of vacuum tube 40, thereby allowing a positive voltage to develop on grid 54 of vacuum tube 50 which allows vacuum tube 50 to conduct and activates the OFF chassis. Transformer TI supplies regenerative feedback to grid 54 of vacuum tube 50, thereby maintaining the vacuum tube in a conducting state. Vacuum tube 50 will stop conducting when the load current pulse on plate 52 falls below a value that can sustain tube conduction. Under normal operating conductions, the load current has the waveform shown in FIGURE 2 which allows the OFF chassis to become inactive without relying on protection circuit 60.

Figure 3:
FIGURE 3 is a sketch of the load current waveform pulse with arcing present during the pulse fall time.

If the load current pulse of plate 52 is extended beyond the normal fall time, as shown in FIGURE 3, the vacuum tube 50 will continue to conduct. This extended conduction time is sensed, by way of a tap on transformer TI, in time delay network 68 and activates thyratron 61. Time delay control 68 is preadjusted to allow for a given fall time of the load current pulse prior to ionization of thyratron 61. Ionization of the thyratron causes the voltage on grid 54 of vacuum tube 50 to approximate the voltage on cathode 56 of vacuum tube 50, causing the plate 52 load current of said vacuum tube 50 to drop below the point where it can sustain the current pulse, thereby causing said pulse to extinguish.

Thyratron 61 will continue to conduct until another ON condition occurs, during which time the OFF chassis will reset.

Although a particular embodiment and form of this invention has been illustrated, it is understood that this invention is to be limited only by the scope of the claims appended hereto.

We claim:

1. A protection circuit for preventing the flow of high peak currents for excessive periods of time, comprising: an electron discharge device including a modulating electrode, first means for applying first periodically recurrent pulses to said electrode for keying said device into conduction during each of said pulses, second means for applying second periodically recurrent pulses to said electrode alternately with said first pulses for cutting off said device and for further applying said second pulses through a time delay to means for supplying disabling feedback pulses to said second means to limit the duration of said cut-off pulses, thereby limiting current flow through said second means, said last means further including means for terminating said feedback pulses upon the application of said first periodically recurrent pulses.

2. The protection circuit as set forth in claim 1 wherein said electron discharge device is a klystron and said modulating electrode is the klystron modulating anode.

3. The protection circuit as set forth in claim 2 wherein said second means comprises an electron tube with associated circuitry including a transformer in the cathode and grid circuit of said electron tube and connected for regenerative feedback.

4. The protection circuit as set forth in claim 3 wherein said means for supplying disabling feedback pulses includes a thyratron having a plate connected as an input to the control grid of said electron tube for preventing high discharge currents from flowing through said electron tube, said time delay comprising an integrating resistance-capacitance network charged from the cathode current of said electron tube.

References Cited

UNITED STATES PATENTS

| | | | |
|---|---|---|---|
| 3,339,146 | 8/1967 | Gorski et al. | 332—13 X |
| 3,246,206 | 4/1966 | Chowdhuri | 307—88.5 |

ROBERT SEGAL, *Primary Examiner.*